(12) United States Patent
Zhang et al.

(10) Patent No.: US 12,236,556 B2
(45) Date of Patent: Feb. 25, 2025

(54) VIDEO RESOLUTION ENHANCEMENT METHOD, STORAGE MEDIUM, AND ELECTRONIC DEVICE

(71) Applicant: BOE TECHNOLOGY GROUP CO., LTD., Beijing (CN)

(72) Inventors: Lijie Zhang, Beijing (CN); Dan Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 430 days.

(21) Appl. No.: 17/762,199

(22) PCT Filed: Apr. 19, 2021

(86) PCT No.: PCT/CN2021/088187
§ 371 (c)(1),
(2) Date: Mar. 21, 2022

(87) PCT Pub. No.: WO2021/213340
PCT Pub. Date: Oct. 28, 2021

(65) Prior Publication Data
US 2022/0292638 A1    Sep. 15, 2022

(30) Foreign Application Priority Data

Apr. 23, 2020 (CN) .......................... 202010326998.X

(51) Int. Cl.
*G06T 3/4053* (2024.01)
*G06T 5/20* (2006.01)
*G06V 10/82* (2022.01)

(52) U.S. Cl.
CPC .............. *G06T 3/4053* (2013.01); *G06T 5/20* (2013.01); *G06V 10/82* (2022.01)

(58) Field of Classification Search
CPC ......... G06T 3/4053; G06T 5/20; G06V 10/82; H04N 21/2356; H04N 21/44008;
(Continued)

(56) References Cited

U.S. PATENT DOCUMENTS

2018/0075581 A1* 3/2018 Shi .......................... G06N 3/045
2021/0383169 A1* 12/2021 Wang ...................... G06T 7/207

FOREIGN PATENT DOCUMENTS

| CN | 107527044 A | 12/2017 |
|---|---|---|
| CN | 108830790 A | 11/2018 |

(Continued)

OTHER PUBLICATIONS

Chadha, Aaron, Alhabib Abbas, and Yiannis Andreopoulos. "Video classification with CNNs: Using the codec as a spatio-temporal activity sensor." IEEE Transactions on Circuits and Systems for Video Technology 29.2 (2017): 475-485. (Year: 2017).*

(Continued)

*Primary Examiner* — Wesley J Tucker
*Assistant Examiner* — Han Hoang
(74) *Attorney, Agent, or Firm* — XSENSUS LLP

(57) ABSTRACT

Provided are a method for enhancing a video resolution enhancement, a computer readable storage medium, and an electronic device. The method includes: obtaining multiple image frames as input data, and obtaining initial data by performing feature extraction on the input data using a first three-dimensional convolutional layer; obtaining first feature data by performing down-sampling on the initial data at a preset multiple; obtaining first reference data by performing a convolution operation on the first feature data using a second three-dimensional convolutional layer to merge the first feature data as one frame; and obtaining first output data by performing up-sampling on the first reference data at the preset multiple.

20 Claims, 7 Drawing Sheets

(58) Field of Classification Search
CPC ......... H04N 21/440263; H04N 7/0117; H04N 19/59; H04N 21/234363
See application file for complete search history.

(56) References Cited

FOREIGN PATENT DOCUMENTS

| | | | |
|---|---|---|---|
| CN | 109003229 A | 12/2018 |
| CN | 109118430 A | 1/2019 |
| CN | 109272450 A | 1/2019 |
| CN | 109360151 A | 2/2019 |
| CN | 109829855 A | 5/2019 |
| CN | 109862370 A | 6/2019 |
| CN | 110136066 A | 8/2019 |
| CN | 110276721 A | 9/2019 |
| CN | 110322400 A | 10/2019 |
| CN | 110717851 A | 1/2020 |
| CN | 111028150 A | 4/2020 |
| EP | 3617947 A1 | 3/2020 |
| KR | 2019-0130478 A | 11/2019 |
| WO | 2018/053340 A1 | 3/2018 |

OTHER PUBLICATIONS

International Search Report and Written Opinion mailed on Jul. 19, 2021, corresponding PCT/CN2021/088187, 8 pages.
Office Action issued on Feb. 25, 2022, in corresponding Chinese patent Application No. 202010326998.X, 21 pages.
Lin Qi et al., "Video Super-Resolution Method Based on Multi-Beale Characteristics Residual Learning Convolutional Neural Network", Journal of Signal Processing, vol. 36 No. 1, Jan. 2020, total 8 pages, DOI: 10.16798/j.issn.1003-0530.2020.01.007.

* cited by examiner

Obtaining second feature data by performing feature extraction on the first reference data using the first three-dimensional convolution layer — S410

Obtaining first output data by performing up-sampling on the second feature data at the preset multiple — S410

VIDEO RESOLUTION ENHANCEMENT METHOD, STORAGE MEDIUM, AND ELECTRONIC DEVICE

CROSS-REFERENCE TO RELATED APPLICATIONS

The present application is a national phase entry under 35 U.S.C. § 371 of International Application No. PCT/CN2021/088187 filed on Apr. 19, 2021, which claims priority to the Chinese Patent Application No. 202010326998.X, filed on Apr. 23, 2020, and titled "VIDEO RESOLUTION ENHANCEMENT METHOD AND APPARATUS, STORAGE MEDIUM, AND ELECTRONIC DEVICE", the entire contents of which are hereby incorporated by reference herein in its entirety.

TECHNICAL FIELD

The present disclosure relates to the field of image processing, and in particular, to a method and apparatus for enhancing a video resolution, a computer-readable storage medium, and an electronic device.

BACKGROUND

With the development of computer and image processing technology, a super-resolution technology for video images provides a good solution for enhancing and amplifying low-resolution videos. It can better amplify low-resolution videos for display on high-resolution display devices.

Video image super-resolution is a very promising technology that may provide better image and video amplification effects compared to a traditional image interpolation method. It can maintain edges and details of the image during amplification, such that a result which is closer to the original high-resolution image is obtained.

It should be noted that the information disclosed in the background section above is only used to enhance the understanding of the background of the present disclosure, and therefore may include information that does not constitute the prior art known to those of ordinary skill in the art.

SUMMARY

According to a first aspect of the present disclosure, there is provided a method for enhancing a video resolution, including: obtaining multiple frames of images as input data, and obtaining initial data by performing feature extraction on the input data using a first three-dimensional convolutional layer; obtaining first feature data by performing down-sampling on the initial data at a preset multiple; obtaining first reference data by performing a convolution operation on the first feature data using a second three-dimensional convolutional layer to merge the first feature data into one frame; and obtaining first output data by performing up-sampling on the first reference data at the preset multiple.

According to an aspect of the present disclosure, there is provided a non-transitory computer-readable storage medium on which a computer program is stored, where the program, when executed by a processor, implements the method for enhancing the video resolution according to the first aspect.

According to an aspect of the present disclosure, there is provided an electronic device including: one or more processors; and a memory configured to store one or more programs which, when executed by the one or more of the processors, cause the one or more processors to implement the method for enhancing the video resolution according to the first aspect.

It should be understood that the above general description and the following detailed description are only exemplary and explanatory, and cannot limit the present disclosure.

BRIEF DESCRIPTION OF THE DRAWINGS

The drawings herein, which are incorporated in and constitute a part of the specification, illustrate embodiments consistent with the present disclosure, and serve to explain the principles of the present disclosure together with the description. The drawings in the following description show only some of embodiments of the present disclosure. For those of ordinary skill in the art, other drawings may be obtained based on these drawings without creative efforts. In the attached drawings.

DETAILED DESCRIPTION

Figure 1:
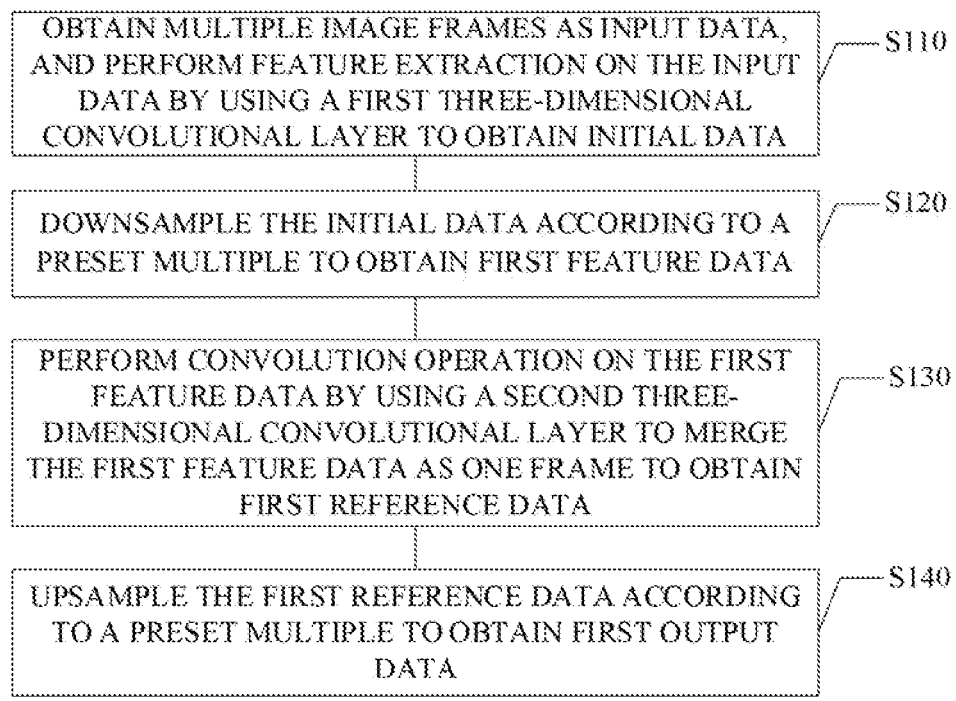
FIG. 1 schematically illustrates a flowchart of a method for enhancing a video resolution according to some embodiments of the present disclosure.

Embodiments will now be described more fully with reference to the accompanying drawings. The embodiments, however, can be embodied in various forms and should not be construed as limited to the examples set forth herein; rather, these embodiments are provided so that this disclosure will be more comprehensive and complete, and will fully convey the concept of example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus repeated descriptions thereof will be omitted. Some of the block diagrams shown in the drawings are functional entities that do not necessarily correspond to physically or logically separate entities. These functional entities may be implemented in software, or in one or more hardware modules or integrated circuits, or in different networks and/or processor devices and/or microcontroller devices.

The video super-resolution method in the related art generally fails to perform a good feature analysis on the input image, resulting in the output image lacking some details of the input image; and in most cases, only frame-by-frame input is allowed, resulting in video inter-frame jitter, and the operation time is relatively longer.

In the embodiments of present disclosure, a method for enhancing a video resolution is provided first. Referring to FIG. 1, the above method for enhancing the video resolution may include the following steps.

S110, obtaining multiple frames of images as input data, and obtaining initial data by performing feature extraction on the input data using a first three-dimensional convolutional layer.

S120, obtaining first feature data by performing down-sampling on the initial data at a preset multiple.

S130, obtaining first reference data by performing a convolution operation on the first feature data using a second three-dimensional convolutional layer to merge the first feature data into one frame.

S140, obtaining first output data by performing up-sampling on the first reference data at the preset multiple.

According to the method for enhancing the video resolution provided in the embodiments, compared with the related art, on the one hand, multiple frames of data are allowed to be input at one time, which effectively solves the problem of video inter-frame jitter; on the other hand, up-sampling and down-sampling at the preset multiple is performed to complete pixel scrambling, which can effectively improve computing efficiency and accelerate operations; on yet another hand, the feature analysis may be effectively performed on the input multi-frame images information through the first three-dimensional convolutional layer, and the image details of the output result may be effectively improved.

Hereinafter, each step of the method for enhancing the video resolution in the embodiment will be described in more detail with reference to the accompanying drawings and embodiments.

Step S110, obtaining multiple frames of images as input data, and obtaining initial data by performing feature extraction on the input data using a first three-dimensional convolutional layer.

In an embodiment of the present disclosure, the input data may include multiple frames of continuous images, for example, three frames of continuous images, four frames of continuous images, or more frames of continuous images. The use of continuous images may provide a better video resolution enhancement effect. In another embodiment, the input data may further include multiple frames of non-continuous images, and multiple frames of images are not specifically limited in the embodiment.

In the embodiment, one or more characteristic parameters of the input data may be expressed as (B, T, H, W, C), which include the height (H), width (W) and time (T) of the images, and the batch size (B) of input data and the number of channels (C). Each frame of image corresponds to one time. The batch size of input data indicates the number of the input data simultaneously input. For example, when the input data includes three frames of continuous images, each frame of image corresponds to one height, width and time; when three groups of three frames of continuous images are input simultaneously, the batch size is three. At this time, since the characteristic parameters for the images include the height, width and time of the images, the number of channels is three in the embodiment In the embodiment, the input data including three frames of continuous images are detailed described. The input data includes three frames of continuous images, at this time, the time (T) is 3. Since only one group of three frames of continuous data is input, the batch size (B) is 1. The input data of the images also includes the height and width of the images, which may be obtained after the input images are determined. At this time, the number of channels (C) is 3.

In the embodiment, the first three-dimensional convolution layer is used to perform the feature extraction on the input data to obtain the initial data. In the embodiment, the first three-dimensional convolution layer does not change the kind of the characteristic parameters of the input data, e.g., the input is (B, T, H, W, C) and the output may also be (B, T, H, W, C). The convolution kernel of the first three-dimensional convolution layer may be a matrix of 1*3*3, respectively corresponding to (T, H, W), and the stride may be (1, 1, 1), respectively corresponding to (T, H, W).

In step S120, obtaining first feature data by performing down-sampling on the initial data at the preset multiple.

Figure 2:
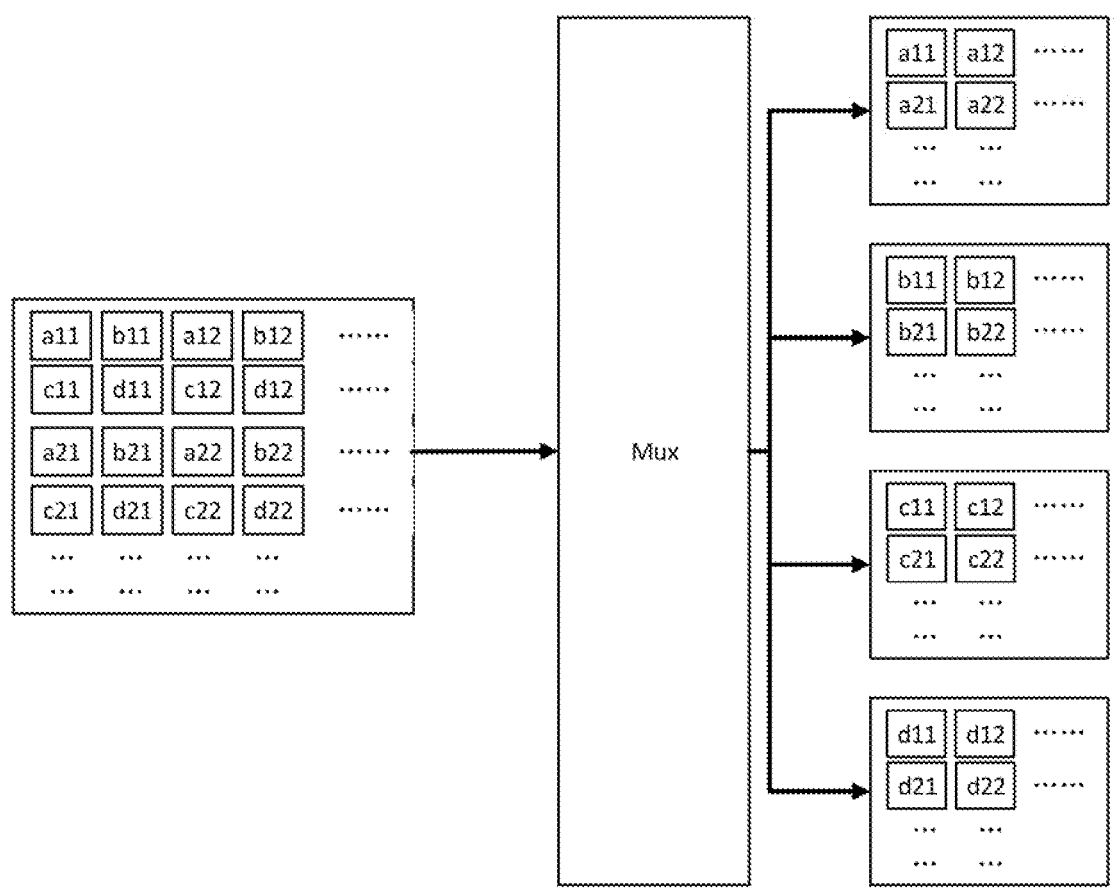
FIG. 2 schematically illustrates a schematic diagram of down-sampling according to some embodiments of the present disclosure.

In an embodiment of the present disclosure, the server performs down-sampling at the preset multiple on the initial data obtained by performing the feature extraction through the first three-dimensional convolutional layer. In the embodiment of the present disclosure, taking the preset multiple being 2 as an example for description, the original matrix of the initial data is decomposed into four small matrices whose length and width are half of the original matrix. Referring to FIG. 2, MUX layer may be used to perform down-sampling on the initial data, and a two-dimensional matrix may be decomposed into four sub-matrices whose length and width are half of the original matrix by using the MUX layer.

In the embodiment, the preset multiple may be an even number such as 2, 4, or 6, and the down-sampling may be accomplished relatively simply by using even multiple of down-sampling. The preset multiple may also be an odd number greater than 1. The preset multiple may be a positive integer greater than or equal to 2. The specific numerical value of the preset multiple is not limited in detail in the embodiment.

In the embodiment, the obtaining the first feature data by performing down-sampling on the initial data at the preset multiple may include: performing down-sampling on the initial data at the preset multiple, and obtaining the first feature data by performing feature extraction on the down-sampled initial data using the first three-dimensional convolutional layer. Specifically, the first three-dimensional convolution layer is used to perform the feature extraction on the down-sampled initial data, that is, the feature extraction is performed on the above multiple sub-matrices to obtain the first feature data. In the embodiment, the convolution kernels of the first three-dimensional convolution layers may be the same, and the strides of the first three-dimensional convolution layers may be the same, thus will not be repeated herein.

In step S130, obtaining first reference data by performing a convolution operation on the first feature data using a second three-dimensional convolutional layer to merge the first feature data into one frame.

In an embodiment of the present disclosure, the second three-dimensional convolutional layer is used to merge the above-mentioned first feature data into one frame to obtain the first reference data. In the embodiment, convolution kernel of the second three-dimensional convolutional layer may be a 3*3*3 matrix, respectively corresponding to the time, height and width of the images, and the stride may be (1, 1, 1). In this case, if the input data is three frames of continuous images, the second convolution layer is used only once to perform a set of convolution operations to merge the three frames of images into one frame, where one frame corresponds to one time. If the input data is five frames of continuous images, the second convolution layer is used twice to perform a set of convolution operations to merge the five frames of images into one frame. If the input data is seven frames of continuous images, the second convolution layer is used three times to perform a set of convolution operations to merge the seven frames of images into one frame.

In the embodiments, the convolution kernel and stride of the second three-dimensional convolution layer are not specifically limited, as long as the first reference data can be obtained by combining multiple frames of first feature data into one frame.

In step S140, obtaining first output data by performing up-sampling on the first reference data at the preset multiple.

Figures 3, 4:
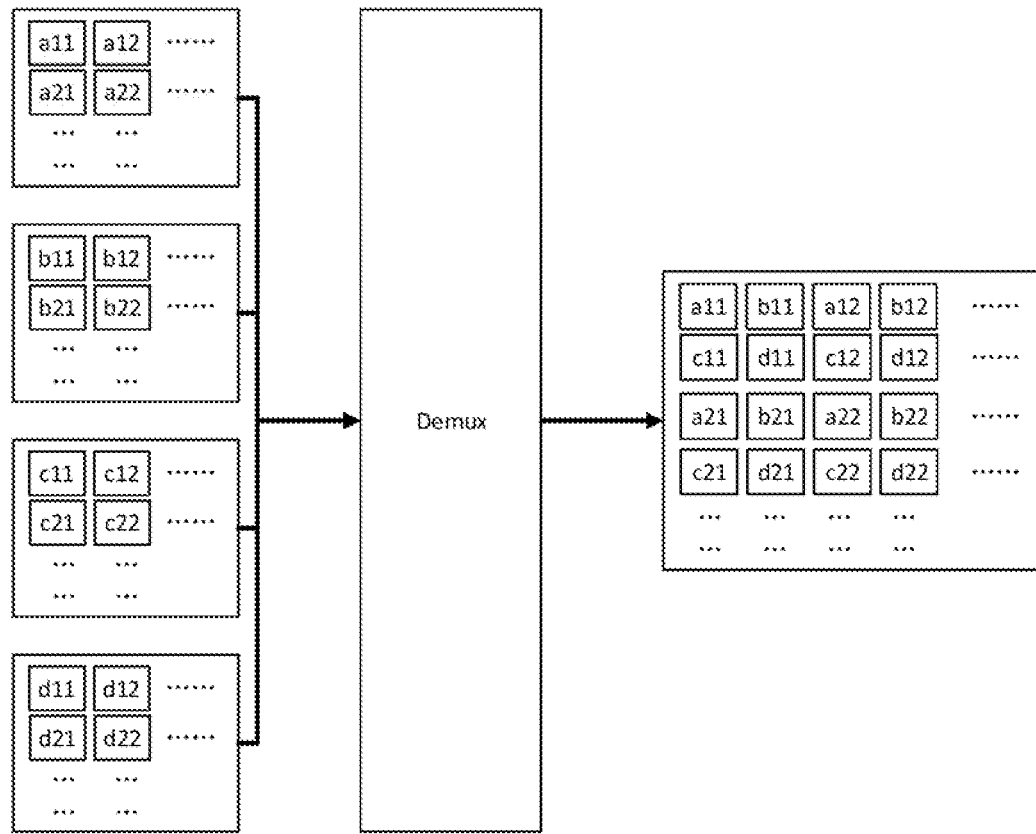
FIG. 3 schematically illustrates a schematic diagram of up-sampling according to some embodiments of the present disclosure.
FIG. 4 schematically illustrates a flowchart of performing up-sampling on first reference data at a preset multiple to obtain first output data according to some embodiments of the present disclosure.

In an embodiment of the present disclosure, the server performs up-sampling on the above-mentioned first reference data at the preset multiple to obtain the first output data. In the embodiments, the up-sampling and down-sampling may be mutually inverse operations. When the preset multiple is 2, the up-sampling may be performed by using the demux layer. Referring to FIG. 3, since the initial data is down-sampled by the above-mentioned down-sampling to obtain the first feature data, i.e., the four sub-matrices, the up-sampling may be used to merge the four sub-matrices into one complete large matrix to obtain the first output data. In this case, the height and width of the images in the first output data are twice as large as the images represented by the first feature data.

In the embodiment, the preset multiple may be an even number such as 2, 4, or 6, and the up-sampling may be performed relatively simply by using the even multiple of up-sampling. The preset multiple may also be an odd number greater than 1. The preset multiple may be a positive integer greater than or equal to 2. The specific numerical value of the preset multiple is not limited in detail in the embodiment.

In another embodiment, referring to FIG. 4, obtaining the first output data by performing up-sampling on the first reference data at the preset multiple may include steps S410 to S420, which will be described in detail below.

In step S410, obtaining second feature data by performing feature extraction on the first reference data using the first three-dimensional convolution layer.

In an embodiment of the present disclosure, the feature extraction is performed on the first reference data using the first three-dimensional convolution layer to obtain the second feature data. In this solution, the convolution kernels of the first three-dimensional convolution layers may be the same, and strides of the first three-dimensional convolution layers may be the same, thus will not be repeated herein.

In step S420, obtaining first output data by performing up-sampling on the second feature data at the preset multiple.

In an embodiment of the present disclosure, the first output data is obtained by up-sampling the second feature data. The up-sampling in the embodiment is the same as that in the above step S140, and thus will not be repeated herein.

In an embodiment, referring to FIG. 5, the present disclosure may further include steps S510 to S530, which will be described in detail below.

In step S510, obtaining second output data by performing a convolution operation on the initial data using the second three-dimensional convolution layer to merge the initial data into one frame.

In an embodiment of the present disclosure, the convolution operation is directly performed on the above initial data using the second three-dimensional convolution layer to merge the initial data into one frame to obtain the second output data. In the present disclosure, the convolution kernels of the second three-dimensional convolution layers may all be the same, and may also be customized according to requirements, which are not specifically limited in this embodiment.

In step S520, obtaining target data by stacking the second output data and the first output data and performing a convolution operation using the first three-dimensional convolution layer.

In an embodiment of the present disclosure, matrix addition is performed on the second output data obtained above and the first output data, and then the first three-dimensional convolution layer is used to perform the convolution operation to perform feature extraction again to obtain the target data. The convolution kernel and stride of the first three-dimensional convolution layer in the present disclosure may be the same, and thus it is not repeated herein.

In step S530, obtaining a super-resolution image by performing multiple up-sampling on the target data.

In an embodiment of the present disclosure, the super-resolution image is obtained by performing multiple up-sampling on the target data, and the multiple up-sampling herein may be customized according to requirements. That is, the multiple of amplification of image may be determined as required, which may be double, triple, quadruple, etc., and is not specifically limited in this embodiment.

In an embodiment of the present disclosure, the method for enhancing the video resolution according to the present disclosure may further include: performing an Nth super-resolution operation on the above first feature data. The super-resolution operation may include a down-sampling operation, a first feature extraction operation, a merging operation, a second feature extraction operation, and an up-sampling operation.

In the embodiment, the down-sampling operation may include performing down-sampling on the first feature data at the preset multiple. The first feature extraction operation may include performing the first feature extraction operation on the down-sampled first feature data by using the first three-dimensional convolution layer to obtain third feature data. The merging operation includes performing a convolution operation on the third feature data by using the second three-dimensional convolutional layer to merge the third feature data into one frame to obtain second reference data. The second feature extraction operation may include performing the second feature extraction operation on stacked data of the second reference data and (N+1)th output result by using the first three-dimensional convolution layer to obtain fourth feature data. The up-sampling operation may include performing up-sampling on the fourth feature data at the preset multiple to obtain third output data. The first reference data is updated with the third output data. An input of Nth down-sampling operation is an output of the first feature extraction operation of the (N−1)th super-resolution operation, and N is a positive integer staring from 1.

In the embodiment, the server may update the third output data of the (N−1)th super-resolution operation by using the output of Nth up-sampling operation, and then update the first reference data by using the third output data. Specifically, the server may perform matrix addition by using the output of the Nth up-sampling operation and the original third output data to obtain new third output data to complete the update; and may perform matrix addition by using the updated third output data and the original first reference data to complete the update of the first reference data.

Figure 6:
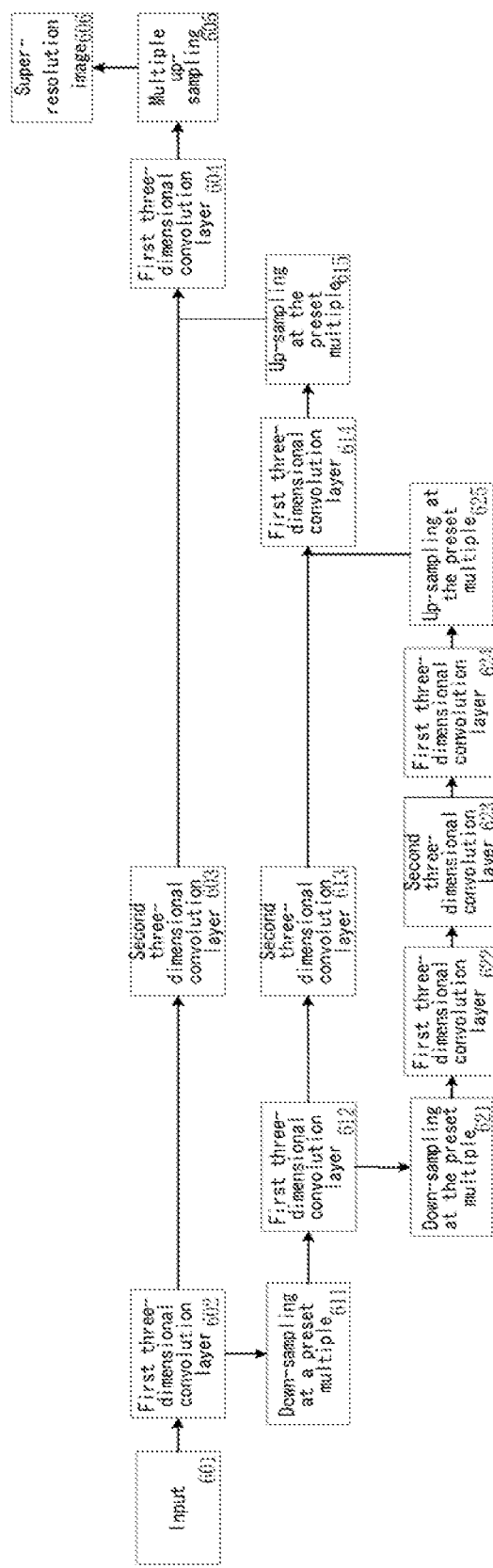
FIG. 6 schematically illustrates a schematic diagram of a method for enhancing a video resolution when N is 1 according to some embodiments of the present disclosure.

In the embodiment, taking N as 1 as an example for detailed description, as shown in FIG. 6, input data may be input from an input 601, and feature extraction is performed on the input data through a first three-dimensional convolution layer 602 to obtain initial data. Second output data is obtained by performing a merging operation on the initial data through a second three-dimensional convolution layer 603. Down-sampling at a preset multiple 611 may be performed on the initial data, and a first three-dimensional convolution layer 612 may be used to perform feature extraction on the down-sampled initial data to obtain first feature data. Then a second three-dimensional convolution layer 613 may be used to perform a convolution operation on the first feature data to merge the first feature data into one frame to obtain the first reference data. A down-sampling at a preset multiple 621 is performed on the first feature data, and then a first feature extraction operation is performed on the down-sampled first feature data by using a first three-dimensional convolution layer 622 to obtain third feature data. A convolution operation is performed on the third feature data by using second three-dimensional convolution layer 623 to merge the third feature data into one frame to obtain second reference data. A second feature extraction is performed on the second reference data by using a first three-dimensional convolution layer 624 to obtain fourth feature data. Next, the server performs up-sampling at a preset multiple 625 on the fourth feature data to obtain third output data. The first reference data is updated by using the third feature data and a feature extraction on the first reference data is performed by using a first three-dimensional convolution layer 614 to obtain second feature data. Up-sampling at a preset multiple 615 is performed on the second feature data to obtain first output data. The second output data and the first output data is stacked and then a convolution operation is performed by using a first three-dimensional convolution layer 604 to obtain target data, and multiple up-sampling 605 is performed on the target data to obtain a super-resolution image 606, such that enhancement of the image resolution is completed.

Figure 7:
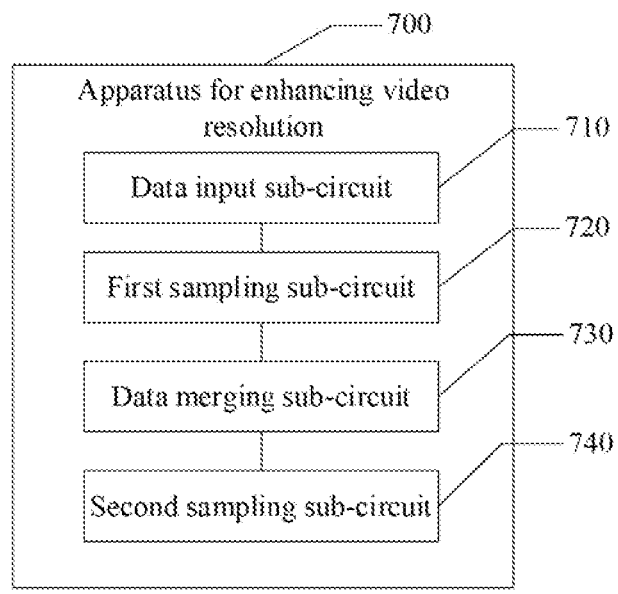
FIG. 7 schematically illustrates a schematic diagram of the composition of an apparatus for enhancing a video resolution according to some embodiments of the present disclosure.

The apparatus embodiments of the present disclosure are described below, which can be used to implement the above method for enhancing the video resolution according to the present disclosure. In addition, in an embodiment of the present disclosure, an apparatus for enhancing a video resolution is also provided. Referring to FIG. 7, the video resolution enhancement apparatus 700 includes: a data input sub-circuit 710, a first sampling sub-circuit 720, a data merging sub-circuit 730, and a second sampling sub-circuit 740.

The data input sub-circuit 710 is configured to obtain multiple frames of images as input data, and obtain initial data by performing feature extraction on the input data using a first three-dimensional convolutional layer. The first sampling sub-circuit 720 is configured to obtain first feature data by performing down-sampling on the initial data at a preset multiple. The data merging sub-circuit 730 is configured to obtain first reference data by performing a convolution operation on the first feature data using a second three-dimensional convolutional layer to merge the first feature data into one frame. The second sampling sub-circuit 740 is configured to obtain first output data by performing up-sampling on the first reference data at the preset multiple.

Since various functional modules of the apparatus for enhancing the video resolution according to the embodiment of the present disclosure correspond to the steps of the above embodiments of the method for enhancing video resolution, for details not disclosed in the embodiments of the apparatus according to the present disclosure, please refer to the embodiments of the above method for enhancing the video resolution according to the present disclosure.

It should be noted that although several modules or units of the apparatus for action performance are mentioned in the above detailed description, this division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

In addition, in an embodiment of the present disclosure, an electronic device capable of realizing the above video resolution enhancement is also provided.

As will be appreciated by one skilled in the art, various aspects of the present disclosure may be implemented as a system, method or program product. Therefore, various aspects of the present disclosure may be embodied in the following forms: complete hardware embodiments, complete software embodiments (including firmware, microcode, etc.), or combination embodiments of hardware and software aspects, which may be collectively referred to herein as "circuit", "module" or "system".

An electronic device 800 according to such an embodiment of the present disclosure is described below with reference to FIG. 8. The electronic device 800 shown in FIG. 8 is only an example, and should not impose any limitation on the function and scope of use of the embodiments of the present disclosure.

Figure 8:
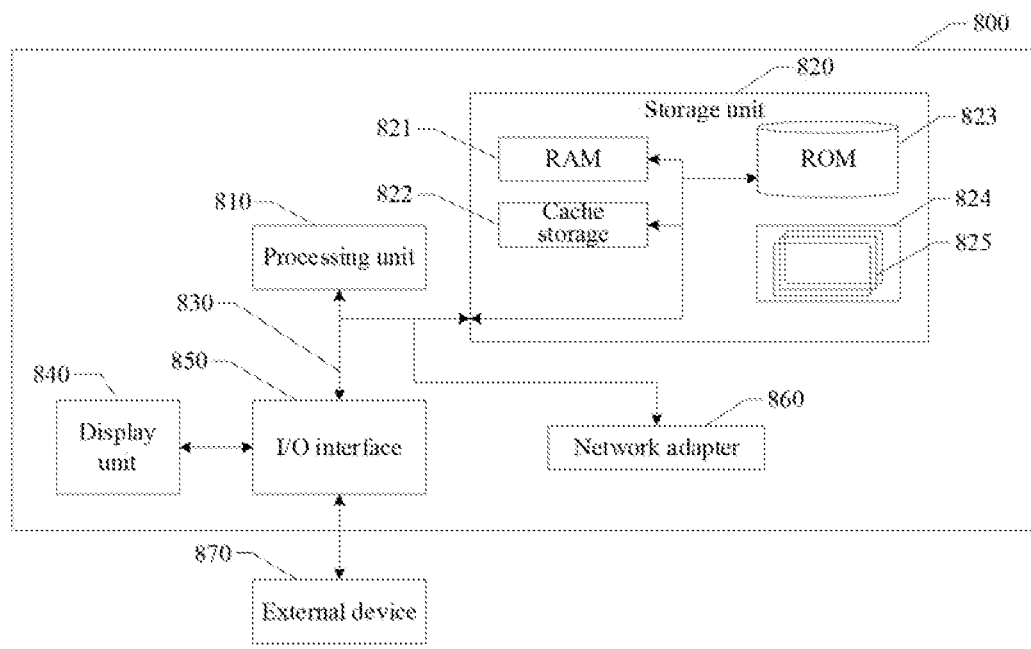
FIG. 8 schematically illustrates a structural schematic diagram of a computer system adapted to implement an electronic device according to some embodiments of the present disclosure.

As shown in FIG. 8, electronic device 800 takes the form of a general-purpose computing device. Components of the electronic device 800 may include, but are not limited to: at least one of the processing units 810, at least one of the storage units 820, a bus 830 connecting different system components (including the storage unit 820 and the processing unit 810), and a display unit 840.

The storage unit stores program codes, and the program codes may be executed by the processing unit 810, so that the processing unit 810 executes steps of various embodiments according to the present disclosure described in the above method embodiments of this specification. For example, the processing unit 810 may perform step S110 as shown in FIG. 1: obtaining multiple frames of images as input data, and obtaining initial data by performing feature extraction on the input data using a first three-dimensional convolutional layer, where the first three-dimensional convolutional layer does not change the characteristic parameters of the input data; S120, performing down-sampling on the initial data at a preset multiple, and performing feature extraction on the down-sampled initial data by using the first three-dimensional convolutional layer to obtain first feature data; S130, obtaining first reference data by performing a convolution operation on the first feature data using a second three-dimensional convolutional layer to merge the first feature data into one frame; S140, obtaining first output data by performing up-sampling on the first reference data at the preset multiple.

Figure 5:
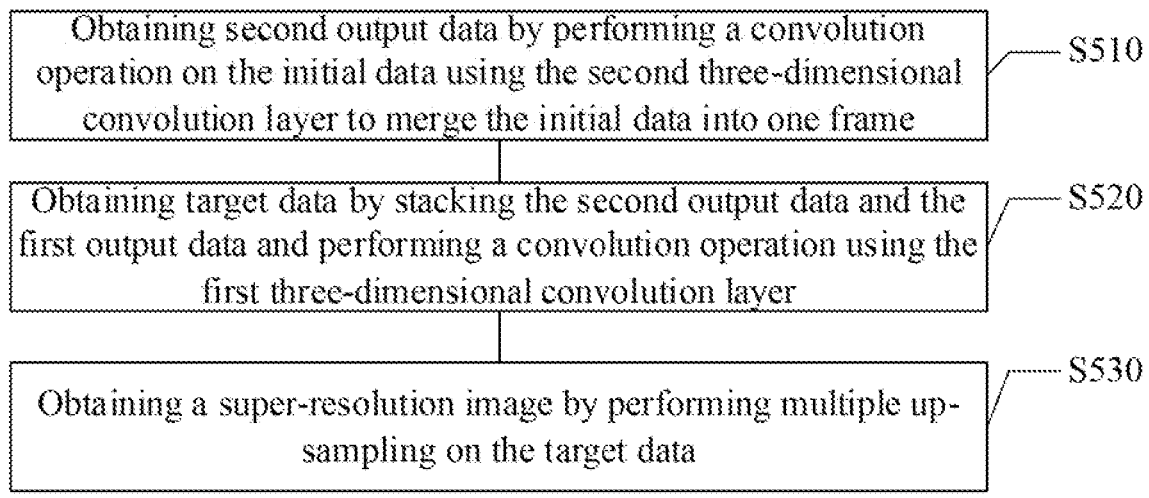
FIG. 5 schematically illustrates a flowchart of a method for enhancing a video resolution according to some embodiments of the present disclosure.

For another example, the electronic device may implement the various steps shown in FIGS. 1 and 5.

The storage unit 820 may include a readable medium in the form of a volatile storage unit, such as a random access storage unit (RAM) 821 and/or a cache storage unit 822, and may further include a read only storage unit (ROM) 823.

The storage unit 820 may also include a program/utility 824 having a set (at least one) of program modules 825, and such program modules 825 include, but not limited to: an operating system, one or more application programs, other program modules, and program data, an implementation of a network environment may be included in each or some combination of these examples.

The bus 830 may be representative of one or more of several types of bus structures, including a memory cell bus or memory cell controller, a peripheral bus, a graphics acceleration port, a processing unit, or a local bus using any of a variety of bus structures.

The electronic device 800 may also communicate with one or more external devices 870 (for example, keyboards, pointing devices, Bluetooth devices, etc.), may further communicate with one or more devices that enable a user to interact with the electronic device 800, and/or with any device (e.g., routers, modems, etc.) that enables the electronic device 800 to communicate with one or more other computing devices. Such communication may take place through input/output (I/O) interface 850. Also, the electronic device 800 may communicate with one or more networks (e.g., a local area network (LAN), a wide area network (WAN), and/or a public network such as the Internet) through a network adapter 860. As shown, the network adapter 860 communicates with other modules of the electronic device 800 via the bus 830. It should be understood that, although not shown in the drawing, other hardware and/or software modules may be used in conjunction with electronic device 800, including but not limited to: microcode, device drivers, redundant processing units, external disk drive arrays, RAID systems, tape drives and data backup storage systems.

From the description of the above embodiments, those skilled in the art can easily understand that the embodiments described herein may be implemented by software, or may be implemented by software combined with necessary hardware. Therefore, the technical solutions according to the embodiments of the present disclosure may be embodied in the form of software products, and the software products may be stored in a non-volatile storage medium (which may be a CD-ROM, a USB flash disk, a portable hard drive, etc.) or on a network, including several instructions to cause a computing device (which may be a personal computer, a server, a terminal device, a network device, or the like) to execute the method according to the embodiments of the present disclosure.

In an embodiment of the present disclosure, there is also provided a computer-readable storage medium on which a program product capable of implementing the above-described method according to the present specification is stored. In some possible embodiments, various aspects of the present disclosure may also be implemented in a form of a program product including program codes. When the program product is run on a terminal device, the program codes are configured to cause the terminal device to perform the steps according to various embodiments of the present disclosure described in the above-mentioned method embodiments of this specification.

Figure 9:
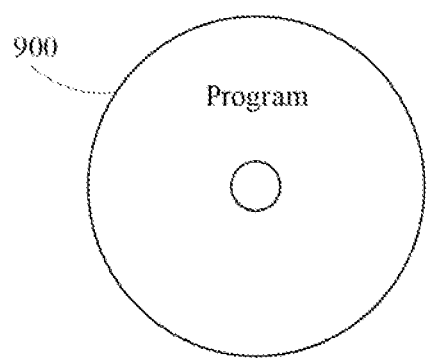
FIG. 9 schematically illustrates a schematic diagram of a computer-readable storage medium according to some embodiments of the present disclosure.

Referring to FIG. 9, a program product 900 for implementing the above-described method according to an embodiment of the present disclosure is described, the program product may adopt a portable compact disc read only memory (CD-ROM) and include program codes, and may be run on a terminal device, such as a personal computer. However, the program product according to the present disclosure is not limited thereto, and in this document, a readable storage medium may be any tangible medium that contains or stores a program that can be used by or in conjunction with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination thereof. More specific examples (a non-exhaustive list) of readable storage media include: an electrical connection with one or more wires, a portable disk, a hard drive, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

A computer readable signal medium may include a propagated data signal in baseband or as part of a carrier wave with readable program code embodied thereon. Such a propagated data signal may take a variety of forms including, but not limited to, an electromagnetic signal, a optical signal, or any suitable combination of thereof. A readable signal medium may also be any readable medium other than a readable storage medium, and the readable medium can transmit, propagate, or transport a program for use by or in connection with an instruction execution system, apparatus, or device.

Program codes embodied on the readable medium may be transmitted using any suitable medium, including but not limited to wireless or wire lines, optical fiber cables, RFs, etc., or any suitable combination thereof.

Program codes for performing the operations of the present disclosure may be written in any combination of one or more programming languages, and the programming languages include object-oriented programming languages such as Java, C++, etc., and further include conventional procedural programming languages such as the "C" language or similar programming languages. The program codes may execute entirely on the user's computing device, partly on the user's device, as a separate software package, partly on the user's computing device and partly on a remote computing device, or entirely on the remote computing device or server execute on. In the case of the remote computing device, the remote computing device may be connected to the user computing device through any kind of network, including a local area network (LAN) or a wide area network (WAN), or may be connected to an external computing device (e.g., using an Internet service provider business via an Internet connection).

In addition, the above-mentioned figures are merely schematic illustrations of the processes included in the methods according to the embodiments of the present disclosure, and are not intended to be limiting. It is easy to understand that the processes shown in the above drawings do not indicate or limit the chronological order of these processes. In addition, it is also readily understood that these processes may be performed synchronously or asynchronously, for example, in a plurality of modules.

Other embodiments of the present disclosure will readily occur to those skilled in the art upon consideration of the specification and practice of the invention disclosed herein. The present disclosure is intended to cover any variations, uses, or adaptations of the present disclosure that follow the general principles of the present disclosure and include common knowledge or conventional technical means in the technical field which are not disclosed by the present disclosure. The specification and embodiments are to be regarded as exemplary only, with the true scope and spirit of the disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for enhancing a video resolution, comprising:
   obtaining multiple frames of images as input data, and obtaining initial data by performing feature extraction on the input data using a first three-dimensional convolutional layer;
   obtaining first feature data by performing down-sampling on the initial data at a preset multiple;
   obtaining first reference data by performing a convolution operation on the first feature data using a second three-dimensional convolutional layer to merge the first feature data into one frame; and
   obtaining first output data by performing up-sampling on the first reference data at the preset multiple;
   wherein the method further comprises:
   performing an Nth super-resolution operation on the first feature data, the super-resolution operation comprising a down-sampling operation, a first feature extraction operation, a merging operation, a second feature extraction operation, and an up-sampling operation, wherein
   the down-sampling operation comprises performing down-sampling on the first feature data at the preset multiple;
   the first feature extraction operation comprises performing the first feature extraction operation on the down-sampled first feature data by using the first three-dimensional convolution layer to obtain third feature data;
   the merging operation comprises performing a convolution operation on the third feature data by using the second three-dimensional convolutional layer to merge the third feature data into one frame to obtain second reference data;
   the second feature extraction operation comprises performing the second feature extraction operation on stacked data of the second reference data and (N+1)th output result by using the first three-dimensional convolution layer to obtain fourth feature data; and
   the up-sampling operation comprises performing up-sampling on the fourth feature data at the preset multiple to obtain third output data; and
   updating the first reference data with the third output data;
   wherein an input of Nth down-sampling operation is an output of the first feature extraction operation of (N−1)th super-resolution operation, and N is a positive integer starting from 1.

2. The method according to claim 1, wherein the obtaining the first feature data by performing down-sampling on the initial data at the preset multiple comprises:
   performing down-sampling on the initial data at the preset multiple, and
   obtaining the first feature data by performing feature extraction on the down-sampled initial data using the first three-dimensional convolutional layer.

3. The method according to claim 1, further comprising:
   obtaining second output data by performing a convolution operation on the initial data using the second three-dimensional convolution layer to merge the initial data into one frame;
   obtaining target data by stacking the second output data and the first output data and performing a convolution operation using the first three-dimensional convolution layer; and
   obtaining a super-resolution image by performing multiple up-sampling on the target data.

4. The method according to claim 1, wherein the obtaining the first output data by performing up-sampling on the first reference data at the preset multiple comprises:
   obtaining second feature data by performing feature extraction on the first reference data using the first three-dimensional convolutional layer; and
   obtaining the first output data by performing up-sampling on the second feature data at the preset multiple.

5. The method according to claim 1, wherein the updating the first reference data with the third output data comprises:
   updating the third output data output by (N−1)th up-sampling operation using an output of Nth up-sampling operation; and
   obtaining a updated first reference data by stacking the third output data and the first reference data.

6. The method according to claim 1, wherein at least one characteristic parameter of the input data comprises a quantity of channels, a batch size, and a height, width and time of each frame of the image; and
   wherein the batch size is a quantity of the input data simultaneously input.

7. The method according to claim 1, wherein the preset multiple is an even number.

8. A non-transitory computer-readable storage medium on which a computer program is stored, wherein the program, when executed by a processor, implements a method for enhancing a video resolution comprising:
   obtaining multiple frames of images as input data, and obtaining initial data by performing feature extraction on the input data using a first three-dimensional convolutional layer;
   obtaining first feature data by performing down-sampling on the initial data at a preset multiple;
   obtaining first reference data by performing a convolution operation on the first feature data using a second three-dimensional convolutional layer to merge the first feature data into one frame; and
   obtaining first output data by performing up-sampling on the first reference data at the preset multiple;
   wherein the method further comprises:
   performing an Nth super-resolution operation on the first feature data, the super-resolution operation comprising a down-sampling operation, a first feature extraction operation, a merging operation, a second feature extraction operation, and an up-sampling operation; wherein
   the down-sampling operation comprises performing down-sampling on the first feature data at the preset multiple;

the first feature extraction operation comprises performing the first feature extraction operation on the down-sampled first feature data by using the first three-dimensional convolution layer to obtain third feature data;

the merging operation comprises performing a convolution operation on the third feature data by using the second three-dimensional convolutional layer to merge the third feature data into one frame to obtain second reference data;

the second feature extraction operation comprises performing the second feature extraction operation on stacked data of the second reference data and (N+1)th output result by using the first three-dimensional convolution layer to obtain fourth feature data; and the up-sampling operation comprises performing up-sampling on the fourth feature data at the preset multiple to obtain third output data; and updating the first reference data with the third output data;

wherein an input of Nth down-sampling operation is an output of the first feature extraction operation of (N−1)th super-resolution operation, and N is a positive integer starting from 1.

9. The non-transitory computer-readable storage medium according to claim 8, wherein the obtaining the first feature data by performing down-sampling on the initial data at the preset multiple comprises:

performing down-sampling on the initial data at the preset multiple, and obtaining the first feature data by performing feature extraction on the down-sampled initial data using the first three-dimensional convolutional layer.

10. The non-transitory computer-readable storage medium according to claim 8, wherein the obtaining the first output data by performing up-sampling on the first reference data at the preset multiple comprises:

obtaining second feature data by performing feature extraction on the first reference data using the first three-dimensional convolution layer; and obtaining the first output data by performing up-sampling on the second feature data at the preset multiple.

11. The non-transitory computer-readable storage medium according to claim 8, wherein the updating the first reference data with the third output data comprises:

updating the third output data output by (N−1)th up-sampling operation using an output of Nth up-sampling operation; and obtaining a updated first reference data by stacking the third output data and the first reference data.

12. The non-transitory computer-readable storage medium according to claim 8, wherein at least one characteristic parameter of the input data comprises a quantity of channels, a batch size, and a height, width and time of each frame of the image; and wherein the batch size is a quantity of the input data simultaneously input.

13. An electronic device, comprising:
one or more processors; and
a memory configured to store one or more programs which, when executed by the one or more processors, cause the one or more processors to:
obtain multiple frames of images as input data, and obtain initial data by performing feature extraction on the input data using a first three-dimensional convolutional layer;
obtain first feature data by performing down-sampling on the initial data at a preset multiple;
obtain first reference data by performing a convolution operation on the first feature data using a second three-dimensional convolutional layer to merge the first feature data into one frame; and
obtain first output data by performing up-sampling on the first reference data at the preset multiple;

wherein the one or more processors are further configured to:
perform an Nth super-resolution operation on the first feature data, the super-resolution operation comprising a down-sampling operation, a first feature extraction operation, a merging operation, a second feature extraction operation, and an up-sampling operation; wherein the down-sampling operation comprises performing down-sampling on the first feature data at the preset multiple;

the first feature extraction operation comprises performing the first feature extraction operation on the down-sampled first feature data by using the first three-dimensional convolution layer to obtain third feature data;

the merging operation comprises performing a convolution operation on the third feature data by using the second three-dimensional convolutional layer to merge the third feature data into one frame to obtain second reference data;

the second feature extraction operation comprises performing the second feature extraction operation on stacked data of the second reference data and (N+1)th output result by using the first three-dimensional convolution layer to obtain fourth feature data; and the up-sampling operation comprises performing up-sampling on the fourth feature data at the preset multiple to obtain third output data; and update the first reference data with the third output data;

wherein an input of Nth down-sampling operation is an output of the first feature extraction operation of (N−1)th super-resolution operation, and N is a positive integer starting from 1.

14. The electronic device according to claim 13, wherein the one or more processors are further configured to:
perform down-sampling on the initial data at the preset multiple, and
obtain the first feature data by performing feature extraction on the down-sampled initial data using the first three-dimensional convolutional layer.

15. The electronic device according to claim 13, wherein the one or more processors are further configured to:
obtain second output data by performing a convolution operation on the initial data using the second three-dimensional convolution layer to merge the initial data into one frame;
obtain target data by stacking the second output data and the first output data and performing a convolution operation using the first three-dimensional convolution layer; and
obtain a super-resolution image by performing multiple up-sampling on the target data.

16. The electronic device according to claim 13, wherein the one or more processors are further configured to:
obtain second feature data by performing feature extraction on the first reference data using the first three-dimensional convolution layer; and
obtain the first output data by performing up-sampling on the second feature data at the preset multiple.

17. The electronic device according to claim 13, wherein the one or more processors are further configured to:
    update the third output data output by (N−1)th up-sampling operation using an output of Nth up-sampling operation; and
    obtain a updated first reference data by stacking the third output data and the first reference data.

18. The electronic device according to claim 13, wherein at least one characteristic parameter of the input data comprises a quantity of channels, a batch size, and a height, width and time of each frame of the image; and
    wherein the batch size is a quantity of the input data simultaneously input.

19. The electronic device according to claim 13, wherein the preset multiple is an even number.

20. The non-transitory computer-readable storage medium according to claim 17, wherein method further comprises:
    obtaining second output data by performing a convolution operation on the initial data using the second three-dimensional convolution layer to merge the initial data into one frame;
    obtaining target data by stacking the second output data and the first output data and performing a convolution operation using the first three-dimensional convolution layer; and
    obtaining a super-resolution image by performing multiple up-sampling on the target data.

* * * * *